(12) United States Patent
Fuehrer et al.

(10) Patent No.: US 7,949,811 B2
(45) Date of Patent: May 24, 2011

(54) METHOD AND DEVICE FOR CREATING A TIME SCHEDULE FOR TRANSMITTING MESSAGES ON A BUS SYSTEM

(75) Inventors: Thomas Fuehrer, Gerlingen (DE); Bernd Mueller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 10/471,909

(22) PCT Filed: Mar. 14, 2002

(86) PCT No.: PCT/DE02/00917
§ 371 (c)(1),
(2), (4) Date: Apr. 6, 2004

(87) PCT Pub. No.: WO02/076032
PCT Pub. Date: Sep. 26, 2002

(65) Prior Publication Data
US 2004/0153682 A1    Aug. 5, 2004

(30) Foreign Application Priority Data
Mar. 15, 2001 (DE) .................. 101 12 906

(51) Int. Cl.
*G06F 13/00* (2006.01)
*G06F 13/36* (2006.01)
*G06F 13/362* (2006.01)

(52) U.S. Cl. .................. 710/117; 710/107; 710/113

(58) Field of Classification Search ............. 710/6, 107, 710/113, 40, 105–106, 116–117, 119, 123, 710/124
See application file for complete search history.

(56) References Cited

U.S. PATENT DOCUMENTS
5,319,781 A * 6/1994 Syswerda .................. 705/8
6,633,854 B1 * 10/2003 Moore ....................... 706/13

FOREIGN PATENT DOCUMENTS
DE  100 00 302  7/2001
DE  100 00 303  7/2001
DE  100 00 304  7/2001
DE  100 00 305  7/2001

OTHER PUBLICATIONS

Coutinho, Fernanda et al. "Jitter Minimization with Genetic Algorithms". Factory Communication Systems. 2000☐☐Proceedings, 2000 IEEE International Workshop on Porto, Portugal Sep. 6-8, 2000, IEEE. Piscataway, NJ, USA. pp. 267-273. 0-78003-6500-3/00.*
Barreiros, Jorge et al. "Jitter Reduction in a Real-Time Message Transmission System Using Genetic Algorithms". Procedings of the 2000 Congress on Evolutionary Computation. Jul. 16-19, 2000. IEEE. Piscataway, NJ, USA. pp. 1095-1101. 0-7803-6375-2/00.*
Führer, Thomas et al. "Distributed Real-Time Systems (TI-DRTS)—Track 2". Proceedings 7th Internation CAN Conference 2000 in Amsterdam. Oct. 2000. pp. 1-10.*
Führer, Thomas et al. "Time Triggererd Communication on CAN". Available Feb. 18, 2002.*
Hartwich, Florian et al. "Timing in the TTCAN Network". Available Feb. 18, 2002.*

(Continued)

*Primary Examiner* — Thomas J Cleary
(74) *Attorney, Agent, or Firm* — Kenyon & Kenyon LLP

(57) ABSTRACT

A method for creating a time schedule for transmitting messages on a bus system (bus schedule), the time schedule being created by using a genetic algorithm.

13 Claims, 1 Drawing Sheet

OTHER PUBLICATIONS

"TTCAN" Webpage. Can in Automation (CiA). Online Feb. 18, 2002. Retrieved from Internet May 15, 2006. <http://web.archive.org/web/20020620230751/http://www.can-cia.org/can/ttcan/>.*

Montana, David et al. "Using Genetic Algorithms for Complex, Real-Time Scheduling Applications". 1998. IEEE. pp. 245-248. 0-7803-4351-4/98.*

West, Jack M. et al. "A Genetic Algorithm Approach to Scheduling Communications for a Class of Parallel Space-Time Adaptive Processing Algorithms". 2000. Springer-Verlag Berliing Heidelberg. IPDPS 2000 Workshops. LNCS 1800. pp. 855-861. J. Rolim et al. (Eds.).*

Moore, Michelle. "An Accurate and Efficient Parallel Genetic Algorithm to Schedule Tasks on a Cluster". 2003. IEEE. Proceedings of the International Parallel and Distributed Processing Symposium (IPDPS '03). pp. 1-5.*

Goldberg, David E., "Genetic Algorithms in Search, Optimization, and Machine Learning," The University of Alabama, Addison-Wesley Publishing Company, Inc.; Development of CS-1, The First Classifier System, pp. 265-267; Chapter 7, Applications of Genetics-Based Machine Learning, pp. 261-276.

Goldberg, David E., "Genetic Algorithms in Search, Optimization, and Machine Learning," pp. 1-25.

* cited by examiner

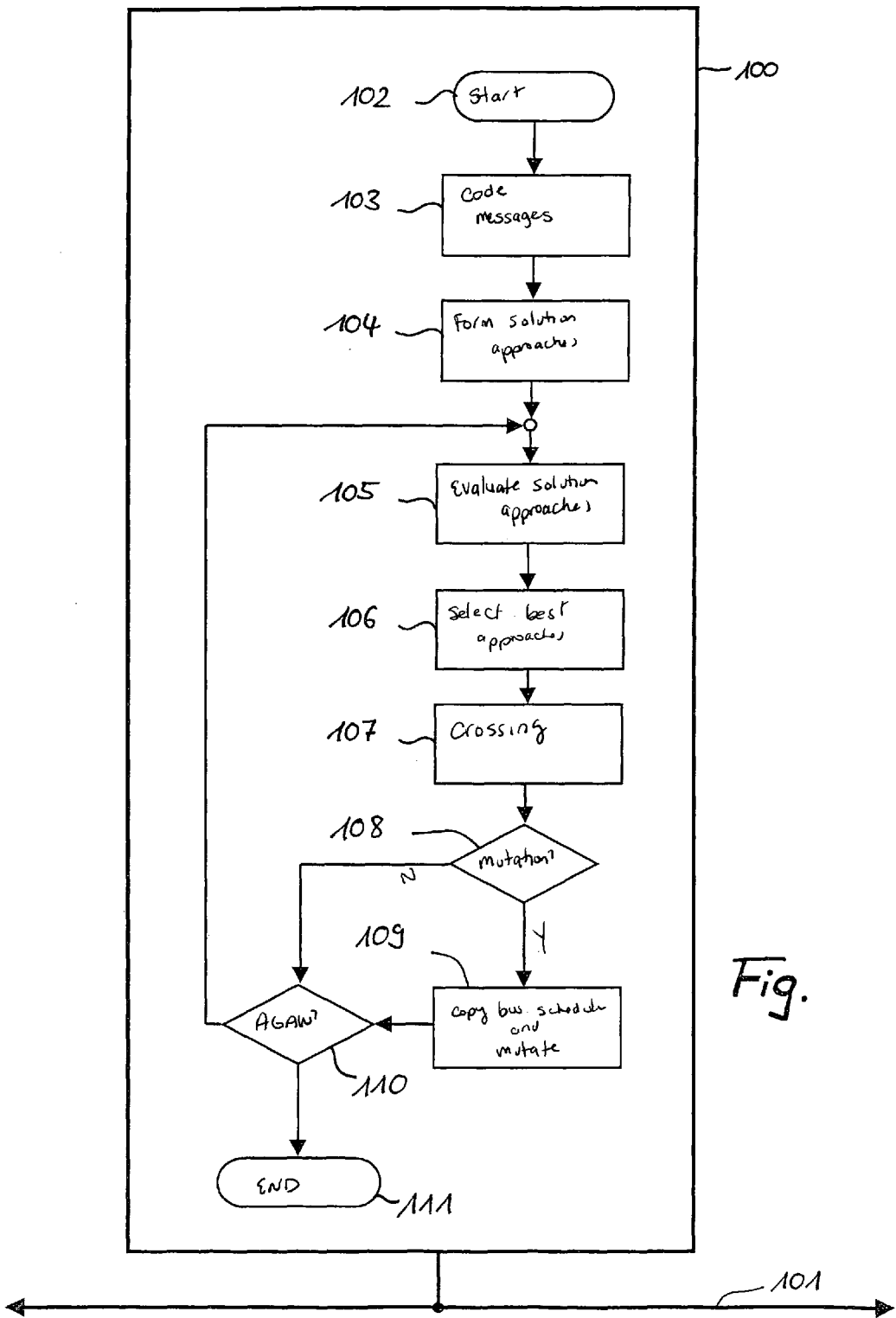
Fig.

METHOD AND DEVICE FOR CREATING A TIME SCHEDULE FOR TRANSMITTING MESSAGES ON A BUS SYSTEM

FIELD OF THE INVENTION

The present invention relates to a method and a device as well as a computer program and a computer program product for creating a time schedule for transmitting messages on a bus system.

BACKGROUND INFORMATION

The networking of control units, sensors and actuator systems with the aid of a communications system or bus system has drastically increased in recent years in the construction of modern motor vehicles and in machine construction, especially in the field of machine tools and in automation. In this context, synergistic effects may be achieved by the distribution of functions to a plurality of control units. These are called distributed systems. The communication between various stations is taking place more and more via a bus or a bus system. The communications traffic on the bus, access and reception mechanisms, as well as error handling are governed via a protocol.

In the automotive field, the established protocol is the CAN (controller area network). This is an event-driven protocol, i.e., protocol activities such as sending a message are initiated by events which have their origin outside of the communications system. Unique access to the communications system is solved by a priority-based bit arbitration. A prerequisite for this is that a unique priority is assigned to each message. When working with the CAN protocol, this is usually implemented by an identifier which is contained at the beginning of each message and clearly identifies the message content. This identifier or identification ID (message identifier) is of different length depending on the CAN version (e.g., 11 bits for the basic CAN). The CAN protocol is very flexible, and adding additional nodes and messages is possible without difficulty as long as there are still free priorities (especially message identifiers). The collection of all messages to be sent in the network together with priorities is stored in a list, the so-called communications matrix. Thus, in most cases, the creation of the communications matrix is only the collection of all messages in the system. Frequently, the order or sequence of the messages is based on the years-long know-how of the applications engineers and system designers. However, tools also exist which support this creation of the communications matrices.

An alternative approach to the event-driven, spontaneous communication is the purely time-controlled approach. All communications activities on the bus are strictly periodic. Protocol activities such as sending a message are triggered only by the advance in a (global) time. Access to the medium is based on the assignment of time domains during which a transmitter has an exclusive transmission right. The protocol is comparatively inflexible, and adding new nodes is only possible when the respective time domains were already left open beforehand. This situation forces the system designer or applications engineer to already fix the message sequence prior to initial operation. Thus, a timetable or bus schedule is created which must meet the requirements of the messages with respect to rate of repetition, redundancy, deadlines, etc. Therefore, this so-called bus schedule is a timetable or time schedule or sequence plan or communications plan with respect to transmitting messages on the bus. The positioning of the messages within the transmission periods must be matched to the applications which produce the message contents, in order to hold the latencies between application and moment of transmission to a minimum. If this matching does not take place, the advantage of the time-controlled transmission (minimal latency jitter when sending the message on the bus) would be destroyed. Thus, great demands are placed on the planning tools.

The solution approach set forth in German Patent Application No. DE 100 00 302, DE 100 00 303, DE 100 00 304, DE 100 00 305 and also presented in the ISO draft 11898-4, of the time-controlled or time-triggered CAN satisfies the demands outlined above for time-controlled communication, as well as the demands for a certain measure of flexibility. This so-called TTCAN (time-triggered controller area network) meets these demands by the construction of the communications round (basic cycle) in so-called exclusive time windows for periodic messages of specific communications users and in so-called arbitrating time windows for spontaneous messages of a plurality of communications users. However, as described above, when planning a TTCAN network or TTCAN bus system, the time-controlled messages will predetermine the framework for the creation of the bus schedule. The requirements of the time-controlled communication must also be optimally supported or guaranteed in a TTCAN communications matrix or bus schedule or time schedule for the transmission of messages. Only in the second instance may the event-driven messages or arbitrating time windows be taken into account. The suitable planning tools must, as it were, support both worlds of the communications planning.

Great demands are placed on the planning tools for the time-controlled communication and the resolution of the communications relationships (application with respect to the moment of transmitting the message on the bus) in the form of a communications matrix, including the message latencies, message periods and deadlines. Currently available commercial tools, particularly CAN-based tools, still do not support these requirements, such as, for example, TTCAN-specific planning, at all. First solution approaches for strictly time-controlled communications protocols such as TTP/C show that the algorithms to be used quickly end up as an NP-complete problem. The discovery of the global maximum, thus, the best solution for the entire communications network with respect to the bus schedule, cannot be guaranteed. Possibly only quantities of sub-optimal solutions for a bus schedule are found using conventional search algorithms.

Moreover, genetic algorithms are known in the related art. Projects such as VLSI, circuit-layout-generation based on genetic algorithms or the solution of nonlinear equations via genetic algorithms (for fitting potential surfaces) use this technique. A citation from D. Goldberg "Genetic Algorithms in Search, Optimization & Machine Learning" from the Addison-Wesley Publishing Company Inc. of January 1989 shows the basic idea of genetic algorithms: "Genetic algorithms are search algorithms based on the mechanics of natural selection and natural genetics. They combine survival of the fittest among string structures with a structured yet randomized information exchange to form a search algorithm with some of the innovative flair of human search. In every generation, a new set of artificial creatures (strings) is created using bits and pieces of the fittest of the old; an occasional new part is tried for good measure. While randomized, genetic algorithms are no simple random walk. They efficiently exploit historical information to speculate on new search points with expected improved performance."

This approach to alternative searches for solutions in immensely large solution areas had the goal of abstracting and explaining the adaptive processes of the natural systems.

That is to say, in principle, the genetic algorithms are based on natural selection or genetic selection. Survival principles, such as the survival of the fittest, are combined with population or solution structures and the exchange of information arising in this context. Thus, in each generation, new populations or solutions are created which use parts of the best of the old generations. In contrast to genetic algorithms, many functions F supply a wide divergence and discontinuous results, and are therefore unsuitable for many traditional approaches of the search for solutions F(x). Genetic algorithms avoid this problem by simulating the natural evolution according to the Darwinian model.

An object of the present invention is to overcome the problems touched upon with respect to the planning of the time schedule or timetable of the bus, thus of the bus schedule.

SUMMARY

An example embodiment of the present invention combines the advantages of genetic algorithms especially for search objectives over a large solution space with the requirements of the time-controlled communications system TTCAN, to find an optimal bus timetable, thus bus schedule or time schedule for time-controlled, periodic messages and event-driven, spontaneous messages according to TTCAN prior to initial operation.

In accordance with the present invention, a method and a device, as well as a computer program and a computer program product are provided for creating a time schedule for the transmission of messages on a bus system (bus schedule), the time schedule being created by the use of a genetic algorithm. The messages are expediently divided into periodic and spontaneous messages; the messages are already provided with or will be provided with an identifier, in order to have it available in a coding suitable for genetic algorithms.

The bus system is expediently a TTCAN bus system, time windows being provided for the messages, and either the sequence of the time windows and/or of the messages being represented as a time schedule.

From the plurality of potential time schedules, at least one possible time schedule which corresponds to a strong, particularly best solution is advantageously ascertained as solution for a bus schedule. In this context, the time schedules as solution for the bus schedule are evaluated using at least one first specifiable evaluation criterion, based on which an optimization of the time schedules or a selection of the time schedules is made possible.

An expedient first evaluation criterion is the comparison of the sum of the latency times of the least one time schedule to a predefined value or to the sum of the latency times of at least one further time schedule.

A further evaluation criterion simultaneously or alternatively is the comparison of the sum of the deadlines, thus the necessary transfer moments or the necessary transfer times of the messages, specific to the time schedules. In the following, the at least one possible time schedule which is selected as a function of the evaluation criteria is advantageously crossed with at least one second time schedule, particularly a selected time schedule, as well. The time schedules are expediently crossed by the exchange of at least one message of both time schedules or, particularly advantageously, by the exchange of at least one bit of the time schedules, provided they are represented in binary form, particularly with the aid of an identification character or an identifier, whereby a unique bit pattern of the message(s) or of the time windows is included.

In addition to the crossing, it may also be advantageous to provide a mutation, so that at least one bit of at least one time schedule is altered, thus, in particular, is inverted, so that in addition to the good solutions found, further potential solutions develop.

Advantageously, the indicated algorithm or the suitable method may be implemented as a computer program, so that the method of the present invention is carried out when the computer program is executed on a computer or the device of the present invention (which, on the other hand, however, may also be implemented completely in hardware). This computer program may expediently also be available on a data carrier as a computer program product; the data carrier may be in any customary form.

Thus, the advantages of the present invention correspond in particular to the advantages of genetic algorithms in the search for a solution, valid globally to the greatest extent possible, in non-transparent solution spaces. According to the present invention, a TTCAN bus schedule is such a solution space. The mechanisms of evolution, thus, survival of the fittest, ensure that one moves quite quickly to an optimal solution. The mechanism of crossing multiplies, as it were, particularly promising families. The mechanism of mutation ensures that, by chance and/or arbitrary intervention, one is thrown out of the evolution direction of the best solution and possibly finds a further, optimal solution approach. However, this solution approach would possibly only have been found after an unacceptably long time using conventional search algorithms. This new path is possibly promising, so that it is further pursued in the next step of the genetic algorithm, or it falls out again based on the first evaluation function. If a new solution path is taken, then, based on the coding selected in advance and due to the mechanism of crossing, the information already at hand is passed on and not rejected (history).

BRIEF DESCRIPTION OF THE DRAWING

The FIGURE shows a device in which, represented symbolically, the example method of the present invention proceeds.

DETAILED DESCRIPTION OF EXAMPLE EMBODIMENTS

The functioning method in principle of the genetic algorithms is presented in the following steps:

Coding of the parameters or the parameter set in suitable form, thus, here, the messages for the bus schedule. As a suitable form, in particular a bit pattern may be used for the coding, for example, especially the identifier from the controller area network CAN or from the TTCAN. The representation of the periodic and the spontaneous messages of a TTCAN network in a coding suitable for genetic algorithms is, for example, also the coding of the parameter set, e.g., as a bit vector of n×m bits, where m bits code the messages ID, thus the messages identifier or identification character, and n messages are present in the TTCAN network.

The example embodiment of the present invention also includes a first evaluation of the starting population; the intention is to discover the fittest solutions, and they are recognized as a measuring pole for future populations. To that end, at least one evaluation function or evaluation criterion is created, in order to filter the best solutions of a population, thus the most promising time schedules or bus schedules according to the evaluation criteria. Example evaluation criteria or evaluation functions are, for instance, the evaluation according to the minimal sum of all latency times, or the most minimal sum for deadlines according to the approach "earliest deadline first".

Subsequently, in particular, randomly selected instances of the fittest from the first population are crossed with each other, a new population thereby developing, for example, together with several uncrossed. For the technical application with respect to creating the bus schedule, this means the provision of crossing functions, thus, at least one crossing criterion. Using the bit pattern or bit vector as an example, this may be, for instance, the crossing of randomly selected solutions at a specific position k from k ∈[1 ... n×m], where k may likewise be determined by random-number generator, at m bits for the message coding and n messages in the TTCAN network.

Additionally, so-called mutations may optionally be carried out in the case of some instances/solutions or all instances/solutions, again according to specific second evaluation criteria, so that mutations develop from the current population and possibly differ fundamentally from others. Within the scope of the technical application, this in turn means that, for example, within the framework of the TTCAN-binary representation, a random-number generator, for instance, is provided that inverts 1 bit from the n×m bits of the message bit vector, particularly with CAN or TTCAN identifier. These mutations may take place after a certain number of method sequences, e.g. after the 5th or 10th time, or else randomly by random function.

Therefore, after each run-through, the fittest or the best solutions in terms of the evaluation criteria are selected; several of the selected best solutions may once more be crossed, and the optional mutations enable further solution suggestions.

Thus, in accordance with the present invention, the solution of the search problem for an optimal bus schedule for the TTCAN is accomplished using genetic algorithms. In this context, the present invention is not limited to the specific codings of messages for these genetic algorithms or specific evaluation functions, as well as specific crossing or mutation functions described in this exemplary embodiment.

The FIGURE shows a system, particularly a device 100, especially a computer or bus user. Computer 100 may be implemented separately, or may be linked as a bus user to a bus, particularly a TTCAN bus 101. Computer 100 contains an arrangement which makes it possible to allow at least individual method steps of the example method of the present invention to be executed. The execution of the example method in the form of a computer program is particularly advantageous, an optimized solution with respect to the bus schedule thereby being obtained. Thus, in this connection, the integration of the method for finding a solution in a development tool is represented. In this context, the selection of the evaluation function, the selection of the crossing function, as well as the selection of the mutation function may be added individually as a module by the system designer or application engineer, or, from a system-inherent library of these functions, one may be specified or output automatically. Consequently, the development tool may include only the creation of the bus schedule according to the method of the genetic algorithms, thereby ensuring that, depending upon certain system prerequisites or stipulations, for example, by purchasers such as automobile manufacturers, it is possible to employ different metrics, boundary conditions in modular fashion in methods using the same development tool.

Block 102 of the flowchart depicted shows the start of the example method. In block 103, the bus messages are coded, for example, by using an identifier in binary representation. To that end, it is possible to use the identifier of the TTCAN system or of the CAN according to the messages. This coding may already be predetermined, and may only optionally be integrated into the method. Starting from this coding of the bus messages, various possible solution approaches are formed or represented in block 104. In this context, messages and/or time windows may also appear more often than once in the bus schedule. Thus, these approaches for solving the search problem are various sequences of bus messages or time windows for bus messages; given representation in binary form, particularly with identifiers, various bit patterns exist as solution approaches. On one hand, these bit patterns may be generated by a random number generator, or else may be attained by permutation; all possibilities may be made available by permutation. Further criteria for the formation of solution approaches may be certain stipulation criteria, such as time-critical messages first and something similar; or else with respect to the identifier, may be based on priorities of the identifiers, etc. Optionally, it may already be checked, for example, with reference to a library, that when creating possible solution approaches with respect to the time schedule for transmitting messages, only valid messages in the form of bit patterns or only valid identifiers are used.

Invalid solution approaches, particularly bit patterns which are not possible (e.g., because these messages and/or time windows or the corresponding coding do not exist in the system) and thus also invalid time schedules may then optionally already be ruled out in block 104.

In block 105, the evaluation of the solution approaches or the different time schedules, thus the bus schedules, particularly in binary form, by side-by-side arrangement (concentration) of the identifiers of the TTCAN, for example is performed. For instance, to evaluate the solution approaches, all latency times of individual solution approaches are ascertained and compared either to each other or to a reference value, to thus determine the minimal sum of all latency times. Another evaluation may, for example, be on the basis of the minimal or most minimal sum for deadlines, thus, the latest necessary transfer moments or transfer times of the messages. Other criteria are also possible for evaluating the solution approaches.

In block 106, the best solutions, thus the best bus schedules according to the solution approaches and the evaluation criterion/criteria are then selected. In so doing, for instance, a specifiable number of solutions may be selected, thus, for example, the best 50% or the best 5 solutions; or, to select the best solutions, a comparison is made with a threshold value with respect to the evaluation criterion/criteria and only, for example, in the case of minimal sums, upon dropping below this threshold value is the solution chosen as a possible solution to be selected.

In block 107, the crossing functions or crossing criteria are then preselected, and the crossing is carried out. This means that, for instance, in particular, randomly selected solutions, which have resulted from the selection in block 106, exchange at least one bit at a position k which is specifiable or ascertained by random number generator. As discussed above, in addition to randomly ascertaining this exchange position in the bit vector or in the bit pattern, a fixed specification of the crossing position, for instance, each first, each second, each third, or other defined positions may also be preselected. In this context, all solutions may be crossed, or else only some few. Therefore, the number of solution approaches, thus bus schedules, to be crossed may be predefined here, as well. Due to the crossing, a pool of solutions or solution approaches therefore results in block 107, each solution representing a bus schedule or a time schedule for transmitting the messages on the bus. Corresponding to block 104, it may also be provided here to check whether the solutions obtained within the framework of the crossing contain valid bit patterns, thus valid messages and valid identification characters, particularly identifiers, respectively. Consequently, invalid bus schedules as solutions may be sorted out here, as well.

In query 108, it is then checked as a function of specific criteria whether a mutation should or should not be carried out in block 109. These criteria may be, on one hand, that a certain number of method repetitions lead to a mutation, or a mutation is triggered by random number generator. If a mutation is triggered, one arrives at block 109. There, at least one of the solution approaches, thus one bus schedule, is now copied particularly as a bit vector or bit pattern, and this at least one is mutated, for example, by altering at least one bit, particularly by bit inversion, to then be added again to the solution pool. If no mutation is to be carried out, or after the mutation is carried out, one arrives from block 108 or 109 at block 110.

There, it is checked whether a further repetition should be carried out. This check may be carried out, for example, based on the number of bus schedules available, or else based on specific termination criteria after a predefinable number of loop repetitions or the like. This block 110 may optionally also be provided after block 106, thus after the selection of the best solutions according to the evaluation in block 105. If the termination criterion in block 110 is met, one arrives at the end of the method in block 111, or else again at block 105 for evaluation of the existing solution approaches, thus the individual bus schedules from the solution pool.

In summary, by a suitable representation of the parameters, thus, of the parameter set, especially here of the TTCAN messages, for example, as a bit vector which represents a solution variant, many possible solution approaches may be coded in a simple manner. This representation form is optimized for the following repetition of the electronic, adapted, genetic evolution. From the boundary conditions of the application, an evaluation function may be created in a simple manner in order to evaluate the current solution population. For example, this evaluation function F may be created according to the approach "earliest deadline first" or "shortest latency time", etc. The solutions at hand (current population) would then be evaluated using this evaluation function, and the fittest or best would be utilized for the next iteration, for example, the first four solutions having the shortest deadline if evaluation was carried out according to "earliest deadline first". From these fittest or best solutions, one could again take out two solutions and cross them with each other, for example, at position k. Two new solutions are obtained which possibly prove to be still better based on the origin (the next evaluation shows this). The algorithm is free to also process the current population via mutation. In so doing, one bit from a solution bit vector would, for example, be inverted or shifted, etc. (thus mutated), in order to possibly come across a completely new solution approach. This solution approach resulting from the mutation, together with the crossed solutions and the remaining old, fittest solutions are again supplied to the evaluation function, etc.

In principle, the approach of the genetic algorithm may be incorporated into any TTCAN planning tool with suitable interfaces. In so doing, it is necessary to hit upon the number with respect to the coding of the messages for a suitable crossing function and for a suitable mutation function. Also, an evaluation function should be implemented according to a specific metric or individual boundary conditions. This stipulation may either be incorporated permanently into the development tool, or else may be offered as options which are added in modular fashion during the design of a TTCAN network. In principle, given this approach, thus only the method—to search according to genetic algorithms—would have to be implemented in the TTCAN development tool.

Consequently, an advantageous possibility is yielded for attaining an optimized bus schedule in the automated method.

What is claimed is:

1. A method for producing a time schedule for a transmission of messages, on a timed bus system, comprising:
   producing the time schedule by using a genetic algorithm;
   providing the messages, which include both spontaneous and periodic messages, with an identifier; and
   representing the messages, with the corresponding identifier, in a sequence as the time schedule, wherein a plurality of sequences of the identifiers of the messages are provided as potential solutions for a search problem of the genetic algorithm, and wherein the genetic algorithm selects as the time schedule a sequence which optimizes a transmission characteristic of the messages relative to the other sequences in the plurality of sequences, and wherein the transmission characteristic includes at least message latency;
   wherein the selecting of a sequence which optimizes a transmission characteristic of the messages relative to the other sequences includes:
   determining at least one sequence of the messages as at least one possible time schedule; and
   evaluating the at least one possible time schedule by comparing a sum of latency times of the at least one time schedule with one of a predefined value and a sum of latency times of at least one further time schedule.

2. The method according to claim 1, wherein:
   the bus system includes a TTCAN bus system, and
   time windows corresponding to a transmission sequence are provided as the time schedule for the messages.

3. The method according to claim 1, wherein at least one time window which is predefinable with respect to at least one of the sequences is used in the time schedule in order to transmit one of the spontaneous messages and to cause the spontaneous messages to carry out arbitration in the at least one time window.

4. The method according to claim 1, further comprising:
   crossing the at least one possible time schedule which is selected with at least one second possible time schedule.

5. The method according to claim 4, further comprising:
   changing the time schedules to be crossed in such a way that at least one message is exchanged.

6. The method according to claim 4, further comprising:
   changing the time schedules to be crossed in such a way that at least one bit of a bit pattern is exchanged.

7. The method according to claim 1, wherein a bit pattern corresponding to one of a CAN bus and a TTCAN bus is used as an identifier.

8. The method according to claim 1, wherein the at least one sequence of the messages is represented as a time schedule in the form of a bit vector, each entry of the bit vector corresponds to a message identifier, and at least one bit of the bit vector is changed as a function of the evaluation.

9. The method according to claim 8, further comprising:
   changing the at least one bit in accordance with a random function.

10. The method according to claim 1, further comprising:
providing time windows for the transmission of the messages;
determining a plurality of potential time schedules, each potential time schedule being in the form of an n×m bit vector that represents a sequence of the messages, where m is the number of bits in each message identifier and n is the number of messages to be transmitted;
evaluating each potential time schedule to generate a set of best potential schedules by comparing a sum of latency times of the potential time schedule with one of a predefined value and a sum of latency times of at least one further potential time schedule;
randomly selecting a first potential time schedule and a second potential time schedule from the set of best potential schedules;
crossing the first potential time schedule with the second potential time schedule at a position k, where k ranges from 1 to (n×m), thereby exchanging the k bit of the first potential time schedule with the k bit of the second potential time schedule;
changing at least one bit of one of the first potential time schedule and the second potential time schedule, the changing occurring during at least one of predetermined intervals and random intervals.

11. The method according to claim 10, further comprising:
randomly generating the value of k.

12. A device for producing a time schedule for a transmission of messages on a timed bus system, comprising:
an arrangement for producing the time schedule by using a genetic algorithm;
an arrangement for providing the messages, which include both spontaneous and periodic messages, with an identifier; and
an arrangement for representing the messages, with the corresponding identifier, in a sequence as the time schedule, wherein a plurality of sequences of the identifiers of the messages are provided as potential solutions for a search problem of the genetic algorithm, wherein the genetic algorithm selects as the time schedule a sequence which optimizes a transmission characteristic of the messages relative to the other sequences in the plurality of sequences, and wherein the transmission characteristic includes at least message latency;
wherein the selecting of a sequence which optimizes a transmission characteristic of the messages relative to the other sequences includes:
determining at least one sequence of the messages as at least one possible time schedule; and
evaluating the at least one possible time schedule by comparing a sum of latency times of the at least one time schedule with one of a predefined value and a sum of latency times of at least one further time schedule.

13. A non-transitory computer-readable storage medium storing a computer program having codes which, when executed on a computer, controls a method for producing a time schedule for a transmission of messages on a timed bus system, the method comprising:
producing the time schedule by using a genetic algorithm;
providing the messages, which include both spontaneous and periodic messages, with an identifier; and
representing the messages, with the corresponding identifier, in a sequence as the time schedule, wherein a plurality of sequences of the identifiers of the messages are provided as potential solutions for a search problem of the genetic algorithm, wherein the genetic algorithm selects as the time schedule a sequence which optimizes a transmission characteristic of the messages relative to the other sequences in the plurality of sequences, and wherein the transmission characteristic includes at least message latency;
wherein the selecting of a sequence which optimizes a transmission characteristic of the messages relative to the other sequences includes:
determining at least one sequence of the messages as at least one possible time schedule; and
evaluating the at least one possible time schedule by comparing a sum of latency times of the at least one time schedule with one of a predefined value and a sum of latency times of at least one further time schedule.

* * * * *